March 15, 1932. W. S. PARDOE 1,850,030
VENTURI METER
Filed Dec. 14, 1929  2 Sheets-Sheet 1

Inventor:-
William S. Pardoe,
by his Attorneys
Howson & Howson

March 15, 1932. W. S. PARDOE 1,850,030
VENTURI METER
Filed Dec. 14, 1929   2 Sheets-Sheet 2

Inventor:-
William S. Pardoe.
by his Attorneys
Howson & Howson

Patented Mar. 15, 1932

1,850,030

UNITED STATES PATENT OFFICE

WILLIAM S. PARDOE, OF PHILADELPHIA, PENNSYLVANIA

VENTURI METER

Application filed December 14, 1929. Serial No. 414,183.

The present invention relates to pressure difference creating apparatus or devices such as are used with a conduit or pipe section through which a fluid flows and which produce a difference in pressure, the pressure difference bearing a definite relation to the rate of flow of the fluid by means of which the rate of discharge may readily be determined. Such devices are known in the art as Venturi meters or Venturi tubes and my invention particularly refers to an improved form of such tubes, and method of determining the form.

The principal object of my invention is to provide a Venturi tube which produces a change in velocity of fluid flowing therethrough with certainty as to the relation of the flow thereto and to produce such a change in velocity with a minimum loss of head due to friction and other causes in such a tube of shortened length.

Another object of the invention is to construct a tube having a throat section and diverging or flared sections extending therefrom, the internal curved surfaces of which are surfaces of revolution of a mathematical curve, the value of a constant in the equation of the curve depending on the contour of the curve, and said surfaces, which, by experiment have proven to be the most efficient, reducing the loss of head due to friction to a minimum.

Another object of my invention is to provide an improved Venturi tube having a throat section and flared end sections, the curvature of the flared sections depending upon a definite mathematical relation to a constant K which bears a certain relation to the lengths and diameters of the sections.

A still further object of my invention is to provide an improved construction of a Venturi tube which can be quickly and easily installed in existing pipe lines of various diameters. Briefly, my invention comprises a novel form of Venturi tube which may be inserted inside a pipe line, positioned and connected up with a manometer or gauge by simply removing adjacent sections of a pipe line and inserting therein the flow tube to be used.

Other objects and advantages of the invention will be apparent hereinafter from the following detailed description together with the accompanying drawings, in which.

Figure 1:
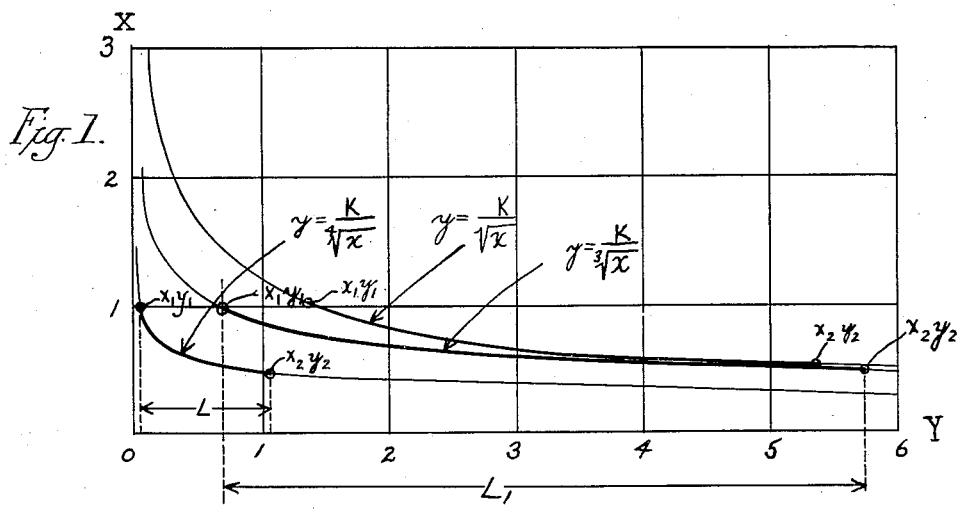
Fig. 1 is a graph of a family of curves, from any one of which the surface of revolution may be derived.

Referring to Fig. 1, three curves have been plotted for the equations $$y=\frac{K}{\sqrt{x}}; \quad y=\frac{K}{\sqrt[3]{x}}; \quad y=\frac{K}{\sqrt[4]{x}}.$$

The general equation for the family of curves, which are substantially rectangular hyperbolas, may be written as follows $$y=\frac{K}{\sqrt[n]{x}}$$

wherein K=a constant determined from the length and diameters of each section. $n=$ any root, although I prefer to use roots between 1 and 5. $x$ and $y$ are the usual Cartesian coordinates. By revolving these curves about the Y axis, the surfaces of revolution are produced, the contour of any one of which I may use for the internal surface of the flared sections of the tube. For the upstream or inlet section, I prefer to use the surface produced by the curve $$y=\frac{K}{\sqrt[4]{x}},$$

while for the downstream or outlet section, I prefer to use the surface produced by the curve $$y=\frac{K}{\sqrt[3]{x}}.$$

Figure 2:
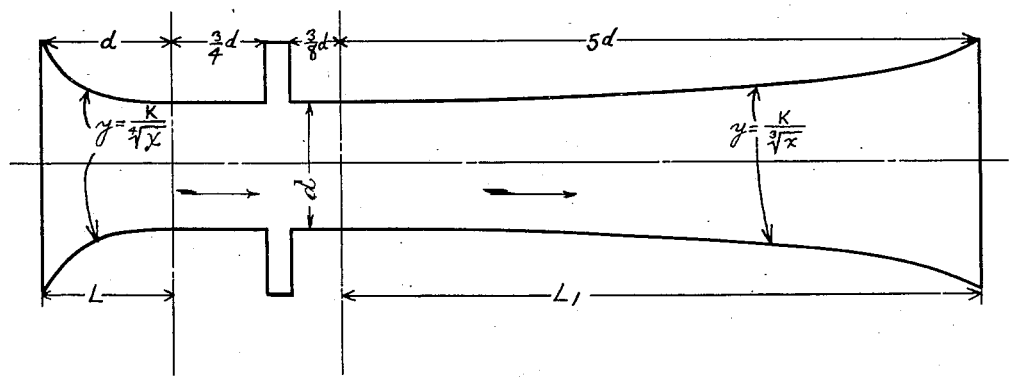
Fig. 2 illustrates schematically the preferred dimensions of the sections in terms of the reduced diameter or throat section of the tube.

By experiment, I have found that the surfaces produced by the preferred equations for the upstream and downstream sections of the tube produce the best results, that is, produce a change of velocity with a minimum loss of head due to friction and other causes, and with them a Venturi tube is obtained which has a substantially greater efficiency and which therefore gives truer readings of velocity change or difference in pressure or quantity of discharge. I have also found that for the best results, the preferred length of the upstream section may be from three-fourths to two and one-fourth times the diameter of the reduced section or throat section at which the change in velocity is to be measured, while the preferred length of the downstream section may be approximately from four and one-eighth to eight and three-eighths times the diameter of the throat section as shown in Fig. 2. I preferably make the length of the straight portion of the upstream section from one-fourth to three-fourths the diameter of the throat section, and the length of the flared portion from one-half to one and one-half times the diameter of the throat section. The length of the straight portion of the downstream section may be from one-eighth to three-eighths the diameter of the throat section, while the length of the flared portion may be from four to eight times the diameter of the throat section. The diameters of the ends of the flared sections may be equal to, greater or less than twice the diameter of the throat section.

The determination of the value of the constant K for a preferred length of tube section and preferred diameters of the throat and the flared end may be made as follows:

Using the upstream section which follows the curve $$y = \frac{K}{\sqrt[4]{x}}$$

let L = length of the section, $d$ = diameter of throat and $2d$ = diameter at flared end.

Then from Fig. 1:

$$y_1 = \frac{K}{\sqrt[4]{x_1}} \quad (1)$$

$$y_2 = \frac{K}{\sqrt[4]{x_2}} \quad (2)$$

$$x_1 = \left(\frac{K}{y_1}\right)^4 \quad (3)$$

$$x_2 = \left(\frac{K}{y_2}\right)^4 \quad (4)$$

Subtracting Equation (3) from Equation (4) we get:

$$x_2 - x_1 = K^4\left(\frac{1}{y_2^4} - \frac{1}{y_1^4}\right) \quad (5)$$

but $x_2 - x_1 = L$ therefore $$L = K^4\left(\frac{1}{y_2^4} - \frac{1}{y_1^4}\right) \quad (6)$$

substituting $$y_2 = \frac{d}{2} \text{ and } y_1 = d$$

we get $$L = K^4\left[\frac{1}{\left(\frac{d}{2}\right)^4} - \frac{1}{(d^4)}\right] \quad (7)$$

$$= K^4\left[\frac{16}{d^4} - \frac{1}{d^4}\right]$$

$$= K^4\left(\frac{15}{d^4}\right)$$

Transposing and solving for K we get $$K = \sqrt[4]{\frac{d^4 L}{15}} = d\sqrt[4]{\frac{L}{15}} \quad (8)$$

After the value of K is determined then the equation $$y = \frac{K}{\sqrt[4]{x}}$$

may be plotted and the desired curve obtained. The procedure is repeated for the downstream section which has the equation—

$$y = \frac{K}{\sqrt[3]{x}}$$

Figure 3:
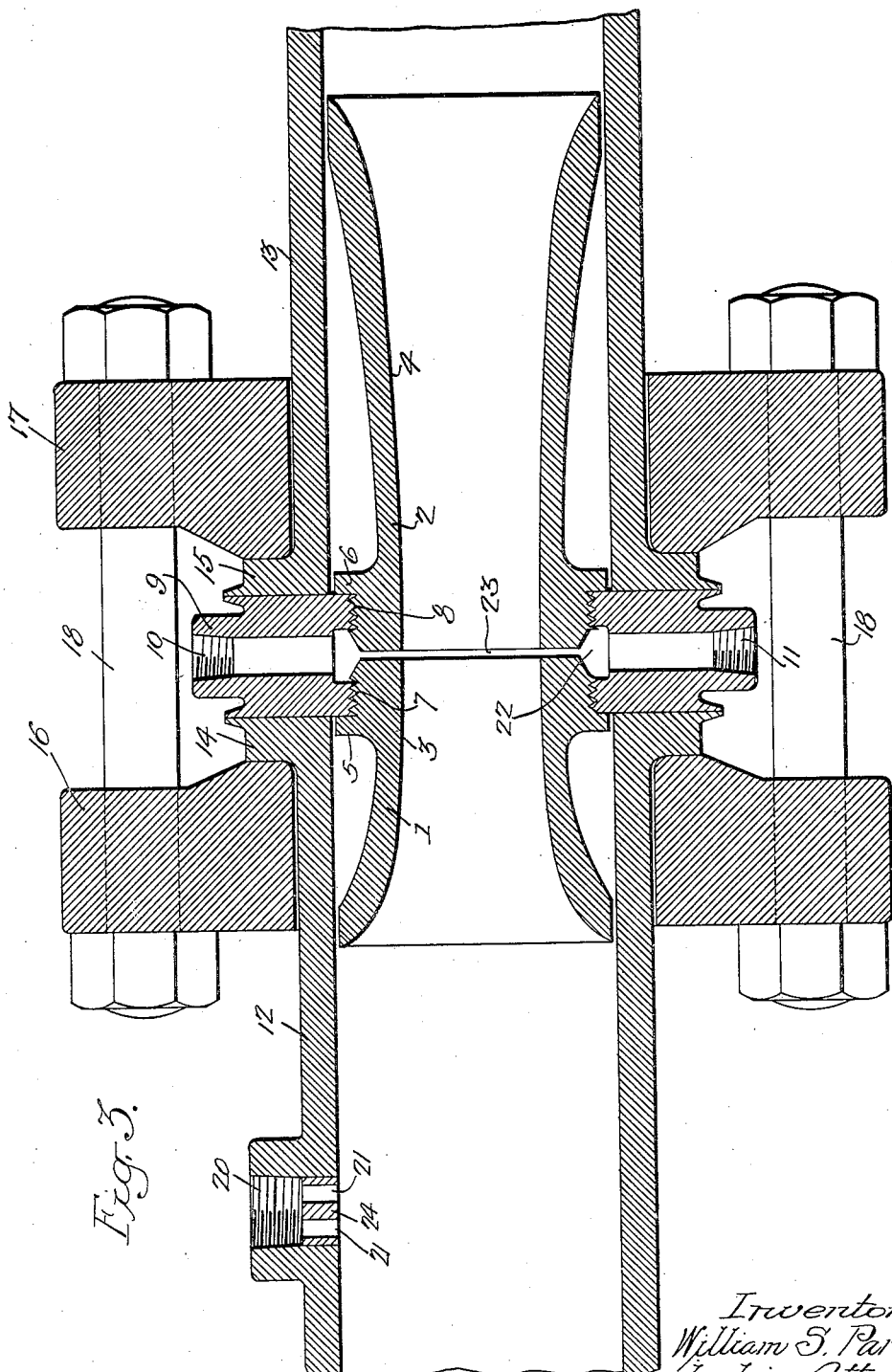
Fig. 3 is a sectional view of my improved Venturi tube inserted between the sections of a pipe line and the manner in which it is held in position.

In Fig. 3, I have illustrated a practical construction of my improved Venturi tube inserted in a conduit in which 1 and 2 are the upstream and downstream sections, respectively, having curved surfaces 3 and 4 constructed in accordance with the mathematical equations hereinbefore mentioned. Each section is provided with a flanged portion 5 and 6 threaded at 7 and 8, respectively, for inserting into the attaching member 9 which is provided with an annular space 22 which communicates with two or more threaded pipe taps 10 and 11 provided for the reception of a manometer connection recording the pressure head at the section 23. The attaching member 9 may be clamped between the pipe sections 12 and 13 by means of the flanged portions 14 and 15, respectively, of the pipe sections which are held together by means of collars 16 and 17 and a series of bolts 18 extending through the collars at various places in their circumferences. A threaded pipe tap 20 is provided in the pipe section 12 in which is inserted a perforated metal disk 24 having openings 21 through which the fluid pressure is transmitted to a manometer tube or gauge threaded in the pipe tap 20. The two tube sections 1 and 2 may be inserted in any size water conduit merely by substituting an attaching member of the proper diameter for the particular size of conduit in place of the member 9. This is easily accomplished by merely loosening the series of bolts 18 and removing the collars 16 and 17 from the flanged portions 14 and 15 of the pipe sections, removing the pipe sections and inserting a member of the required diameter between the pipe sections and clamping it therebetween. The upstream and downstream sections of the tube and the attaching member may be made integral with each other, if desired, instead of separately, as indicated in the drawings without departing from the principle of the invention, in which case, the member 9 may be made of a sufficiently large diameter to adapt it to be inserted in conduits of various diameters between selected limits. The method of obtaining the rate of discharge consists in applying Bernouilli's theory to the sections at which the pressures are measured in the usual way which is old in the hydraulic art and which needs no further discussion.

While I have shown only one embodiment of my invention for the purposes of illustration and description, other changes and modifications may be apparent to those skilled in the art without departing from the scope of the invention and I, therefore, desire to be limted only by the scope of the appended claims.

I claim:

1. In a metering apparatus, the combination with a conduit, of a flow tube located therein, said flow tube comprising a throat section and flared end sections extending therefrom, the internal surfaces of which are surfaces of revolution produced by a substantially rectangular hyperbola having the equation $$y = \frac{K}{\sqrt[n]{x}}$$

wherein K=a constant determined by the length and end diameters of each section, n=an integer between 1 and 3.9 and x and y are the usual Cartesian coordinates.

2. In a metering apparatus, the combination with a conduit, of a flow tube located therein, said flow tube comprising a throat section and flared end sections extending therefrom, the upstream end section having an internal surface which is a surface of revolution produced by a curve having the equation $$y = \frac{K}{\sqrt[4]{x}}$$

wherein x and y are the usual Cartesian coordinates and K=a constant determined by the length and end diameters of the upstream section.

3. In a metering apparatus, the combination with a conduit, of a flow tube located therein, said flow tube comprising a throat section and flared end sections extending therefrom, the downstream end section having an internal surface which is a surface of revolution produced by a curve having the equation $$y = \frac{K_1}{\sqrt[3]{x}}$$

wherein x and y are the usual Cartesian coordinates and K=a constant determined by the length and end diameters of the downstream section.

4. In a metering apparatus, the combination with a conduit, of a flow tube located therein, said flow tube comprising a throat section and flared end sections extending therefrom, one of said end sections being an upstream section having an internal surface which is a surface of revolution produced by a curve having the equation $$y = \frac{K}{\sqrt[4]{x}}$$

and the other end section being a downstream section having an internal surface which is also a surface of revolution produced by a curve having the equation $$y = \frac{K}{\sqrt[3]{x}}$$

where in each equation x and y are the usual Cartesian coordinates and K's are constants determined by the length and end diameters of each section.

5. A metering apparatus comprising a flow tube having a throat section and flared end sections extending therefrom, the internal surfaces of which end sections are surfaces of revolution produced by a curve having the equation $$y = \frac{K}{\sqrt[n]{x}}$$

wherein K=a constant determined by the length and end diameters of each section, n=an integer between 1 and 5 and x and y are the usual Cartesian coordinates, the extreme ends of said flared sections having a diameter approximately twice the diameter of the throat section.

6. A metering apparatus comprising a flow tube having a throat section and flared end sections extending therefrom, the internal surfaces of which end sections are surfaces of revolution produced by a substantially rectangular hyperbola having the equation $$y = \frac{K}{\sqrt[n]{x}}$$

wherein K=a constant determined by the length and end diameters of each section, n=an integer between 1 and 5 and x and y are the usual Cartesian coordinates, the extreme ends of said flared sections having a diameter approximately twice the diameter of the throat section, each of said flared sections having a straight portion adjacent the throat section, one of said flared sections being an upstream section and having the length of its straight portion equal to from one-fourth to three-fourths times the diameter of the throat section and the length of its flared portion equal to from one-half to one and one-half times the diameter of the throat section, the other of said flared sections being a downstream section and having the length of its straight portion equal to from one-eighth to three-eighths times the diameter of the throat section and the length of its flared portion equal to from four to eight times the diameter of the throat section.

7. In a metering apparatus comprising a flow tube having a throat section and flared end sections extending therefrom, the method of determining the curvature of said flared sections which comprises plotting a curve of the equation $$y = \frac{K}{\sqrt[n]{x}}$$

wherein $K$ = a constant determined from the length and end diameters of each section, $n$ = an integer between 1 and 5 and $x$ and $y$ are the usual Cartesian coordinates, revolving the curve about the axis of said flow tube and using portions of the surface of revolution producet thereby to form the flares of said end sections.

8. In a metering device comprising a flow tube having a throat section and flared end sertions extending therefrom, the method of determining the flared sections which comprises plotting the curve of the equation $$y = \frac{K}{\sqrt[n]{x}}$$

wherein $K$ = a constant determined from the length and end diameters of each section. $n$ = an integer between 1 and 5 and $x$ and $y$ are the usual Cartesian coordinates, revolving the curve about the Y axis to produce a surface of revolution and using the portions of the surface in which the value of $y_1$ is twice the value of $y_2$ for the length of the sections equal to $x_2 - x_1$.

9. In a metering apparatus, the combination with a conduit formed of a plurality of pipe sections, of a flow tube located therein through which fluid to be metered flows, said flow tube comprising a throat section and flared end sections extending therefrom, the internal surfaces of said flared sections being surfaces of revolution produced by a curve having the equation $$y = \frac{K}{\sqrt[n]{x}}$$

wherein $K$ = a constant determined from the length and end diameters of each section, $n$ = an integer between 1 and 5 and $x$ and $y$ are the usual Cartesian coordinates, removable means forming an annular passage surrounding said throat section and holding said tube in position in said conduit, said means being provided with a plurality of openings connecting with the annular passage for the reception of connections of fluid pressure-indicating devices, means integral with said pipe sections for holding said first means in place between said pipe sections, and means for clamping the pipe sections together.

WILLIAM S. PARDOE.